United States Patent [19]
Koh

[11] Patent Number: 5,991,848
[45] Date of Patent: Nov. 23, 1999

[54] COMPUTING SYSTEM ACCESSIBLE TO A SPLIT LINE ON BORDER OF TWO PAGES WITHIN ONE CYCLE

[75] Inventor: Dong Bum Koh, Kyoungki-do, Rep. of Korea

[73] Assignee: Hyundai Electronics Industries Co., Ltd., Kyoungki-do, Rep. of Korea

[21] Appl. No.: 08/964,135

[22] Filed: Nov. 6, 1997

[30] Foreign Application Priority Data

Nov. 6, 1996 [KR] Rep. of Korea ............ 96-52479

[51] Int. Cl.⁶ .................................................. G06F 12/08
[52] U.S. Cl. ........................... 711/3; 711/123; 711/201; 711/207; 711/219
[58] Field of Search .............................. 711/3, 123, 201, 711/207, 219

[56] References Cited

U.S. PATENT DOCUMENTS 5,623,619  4/1997  Witt ............................................. 711/3
5,802,576  9/1998  Tzeng et al. ............................. 711/213

Primary Examiner—Reginald G. Bragdon
Attorney, Agent, or Firm—Jacobson, Price, Holman & Stern, PLLC

[57] ABSTRACT

This invention is developed to provide a computing system which can carry out a high speed access to a cache memory within one cycle even though data needed to be read is on the border of two pages. To realize the high speed computing system accessible to a split line on the border of two pages within one cycle, the computing system includes a translation lookaside buffer (TLB) which is designed to have a dual port structure, a prefetcher and a data/code cache memory which is improved for supporting the translated lookaside buffer (TLB).

12 Claims, 3 Drawing Sheets

COMPUTING SYSTEM ACCESSIBLE TO A SPLIT LINE ON BORDER OF TWO PAGES WITHIN ONE CYCLE

BACKGROUND OF THE INVENTION

1. Field of the Invention

The present invention relates to a computing system, and, more particularly, to an improved high speed computing system which is capable of accessing split line data located on the border of two pages within one cycle on a cache read operation through the use of an improved configuration containing a prefetcher, a translational lookaside buffer (TLB) and a cache memory.

2. Description of the Prior Art

A computer system generally employs a memory management unit (MMU) and a cache memory in order to obtain a high performance operation thereof.

Referring to FIG. 1, there is shown a block diagram of a conventional computing system. The computing system includes a prefetcher 11, a translation lookaside buffer (TLB) 12, a page unit 13, a code/data cache memory 14, a bus unit 15, a prefetcher queue 16, an execution unit 17, an aligner 18, a x-pairing checker 19, a y-pairing checker 20, and a decode control unit 21. The prefetcher 11 generates a linear address (LA[31:0]) used in the access of code/data cache memory 14 when an access request signal is received from execution unit 17 and the like. The lower 12-bits (LA[11:0]) of the linear address are relayed to the code/data cache memory 14 because the prefetcher does not carry out an address translation and the upper 20-bits (LA[31:12]) are outputted to TLB 12 and page unit 13 in order to perform an address conversion.

The page unit 13 carries out control of an address translation by receiving the linear address (LA[31:12]) from the prefetcher 11 and a hit signal (TBLhit) from TLB 12. The page unit 13 also outputs a request signal (TWALK[31:2]) for a main memory access to bus unit 15 in order to obtain information for an address translation from a main memory (not shown) when the address translation fails in TLB 12 (a hit signal is not issued).

The TLB 12 stores the information needed to do an address translation and outputs a TLB hit signal to page unit 13 and a translated physical address (PA[31:12]) to code/data cache memory 14 by translating the upper 20-bits (LA[31:12]) of the linear address generated from prefetcher 11 into a physical address.

The code/data cache memory 14 stores instructions to be applied to the prefetcher queue 16 (in the case of a code cache) and to the execution unit 17 (in the case of a data cache); and receives the addresses from prefetcher 11 and the TLB 12 to load a line instruction(32 byte) on the prefetcher queue 16 or the execution unit 17.

There is a 64-bit path to load directly in bus unit 15 to reduce lowering of performance of the computing system as much as possible when an input of an instruction to the decode control unit 21 is interrupted due to an access missing the code/data cache memory 14.

At the decode control unit 21, the instruction is decoded by reading the instruction from the prefetch queue 16 through the aligner 18, if it is necessary. There are two paths directing to the x-pairing and the y-pairing checkers 19 and 20 from a queue pair 0 and 1 to support a dual pipeline.

In the x- and the y-pairing checkers 19 and 20, a possibility of the pairing is determined and informed to prefetcher 11.

As described above, in a general computing system, a translation lookaside buffer (TLB) is used to reduce the times of access to main memory when the system tries to access a main memory after an address translation. An upper address is translated by using translation lookaside buffer (TLB), and, next, compared with a tag of the data/code cache memory by an access to the cache memory. When a prefetch is executed for a spilt line or when a data to be read is located on the border of two pages during an access to the cache memory, the translation lookaside buffer (TLB) should be accessed two times to get a physical address from a first page and a second page.

Consequently, there is a problem of lowering of performance of the conventional computing system which uses an single-port translation lookaside buffer (TLB) and a cache memory because the translation lookaside buffer (TLB) is accessed at least two times and also the cache memory is accessed 2 times when an access to the split line on the border of two pages is carried out.

SUMMARY OF THE INVENTION

It is, therefore, a primary object of the invention to provide a computing system which can access data from a cache memory within one cycle, which is the same access cycle when the data is loaded only in one page, even though the data is loaded over two pages. To realize the computing system, the computing system includes an improved structure of a dual-port translation lookaside buffer (TLB) and a prefetcher and a code/data cache memory which can support the dual-port translation lookaside buffer (TLB).

To achieve the object of this invention, an embodiment of a computing system includes a prefetcher for generating an address corresponding to a request for an access to a code/data cache memory from an execution unit; a page unit for controlling an address translation; a translation lookaside buffer (TLB) for storing information needed for an address translation and translating a virtual linear address input from the prefetcher into a physical address; a code/data cache memory for storing instructions to be sent to a prefetch queue or an execution unit and loading instructions, in a line by line basis, to the prefetch queue or the execution unit by receiving an address from the prefetcher and the translation lookaside buffer (TLB) when the code/data cache memory is requested to be accessed; and a cache request unit or an execution unit for requesting an access to the code/data cache memory or to carry out an instruction and data input form the code/data cache memory.

The prefetcher generates a current address and an address increased from a current line for an access to the cache memory and includes means for generating a signal for an access to a split line and a signal when data is located on the border of two pages by referring to the signals generated by the prefetcher.

The translation lookaside buffer (TLB) has a dual-port structure for translating two input addresses into two physical addresses corresponding to the inputs of a current line address and the address increased from the current line.

The code/data cache memory includes a dual-port cache tag and a cache data random access memory (RAM).

The dual-port cache tag outputs a signal (hit_c) resulting from a comparison between the values of a physical address stored in the cache tag and a physical address of a current line inputted from the translation lookaside buffer (TLB), and also outputs a signal (hit_n) resulting from a comparison between the values of a physical address of an increased line input from the translation lookaside buffer (TLB) and a physical address of an increased line input from the prefetcher. The cache data RAM is designed to output a saved instruction.

Another embodiment of a computing system includes a prefetcher for generating an address corresponding to a request for an access to a code/data cache memory from an execution unit; a page unit for controlling an address translation, a translation lookaside buffer (TLB) for storing information needed for an address translation and translating a virtual linear address input from the prefetcher into a physical address; a code/data cache memory for storing instructions to be sent to a prefetch queue or an execution unit and loading the instructions, in a line by line basis, to the prefetch queue or the execution unit by receiving an address from the prefetcher and the translation lookaside buffer (TLB), when the code/data cache memory is requested to be accessed, and a cache request unit for requesting an access to the code/data cache memory or carrying out an instruction input from the code/data cache memory.

The prefetcher generates a current address and an address increased from a current line for an access to the cache memory and includes a means for generating a signal for an access to a split line and a signal when data is on the border of two pages by referring to the signals generated from the prefetcher.

The translation lookaside buffer (TLB) has a dual-port structure for translating two input addresses into two physical addresses corresponding to the inputs of a current line address and an address increased from the current line.

The cache request unit includes means for generating a signal to select an address between a current address which does not need to be translated and an increased address which does not need to be translated.

The code/data cache memory includes an even tag and odd tag of a single-port and a data random access memory (RAM).

Selection means generates a signal for selecting an address corresponding to a selection signal inputted from the cache request unit between a current address which does not need to be translated and an increased address which does not need to be translated.

The even tag outputs a signal (hit_e) resulting from a comparison between two values of a physical address of an increased line inputted from the translation lookaside buffer (TLB) and a physical address saved in the cache tag selected corresponding to a virtual linear address which is input from the selection means and does not need to be translated, and a signal (hit_o) resulting from a comparison between the values of a physical address of a current line input from the translation lookaside buffer (TLB) and a physical address saved in a tag selected by a virtual linear address which is input from the prefetcher and does not need to be translated.

The random access memory (RAM) is designed to output a instruction.

BRIEF DESCRIPTION OF THE DRAWINGS

The above and other objects and features of the present invention will become apparent from the following description of preferred embodiments given in conjunction with the accompanying drawings, in which.

BRIEF DESCRIPTION OF THE DRAWINGS

The embodiments of this invention will be described in detail with reference to the accompanying drawings of FIGS. 2 to 4.

Figure 1:
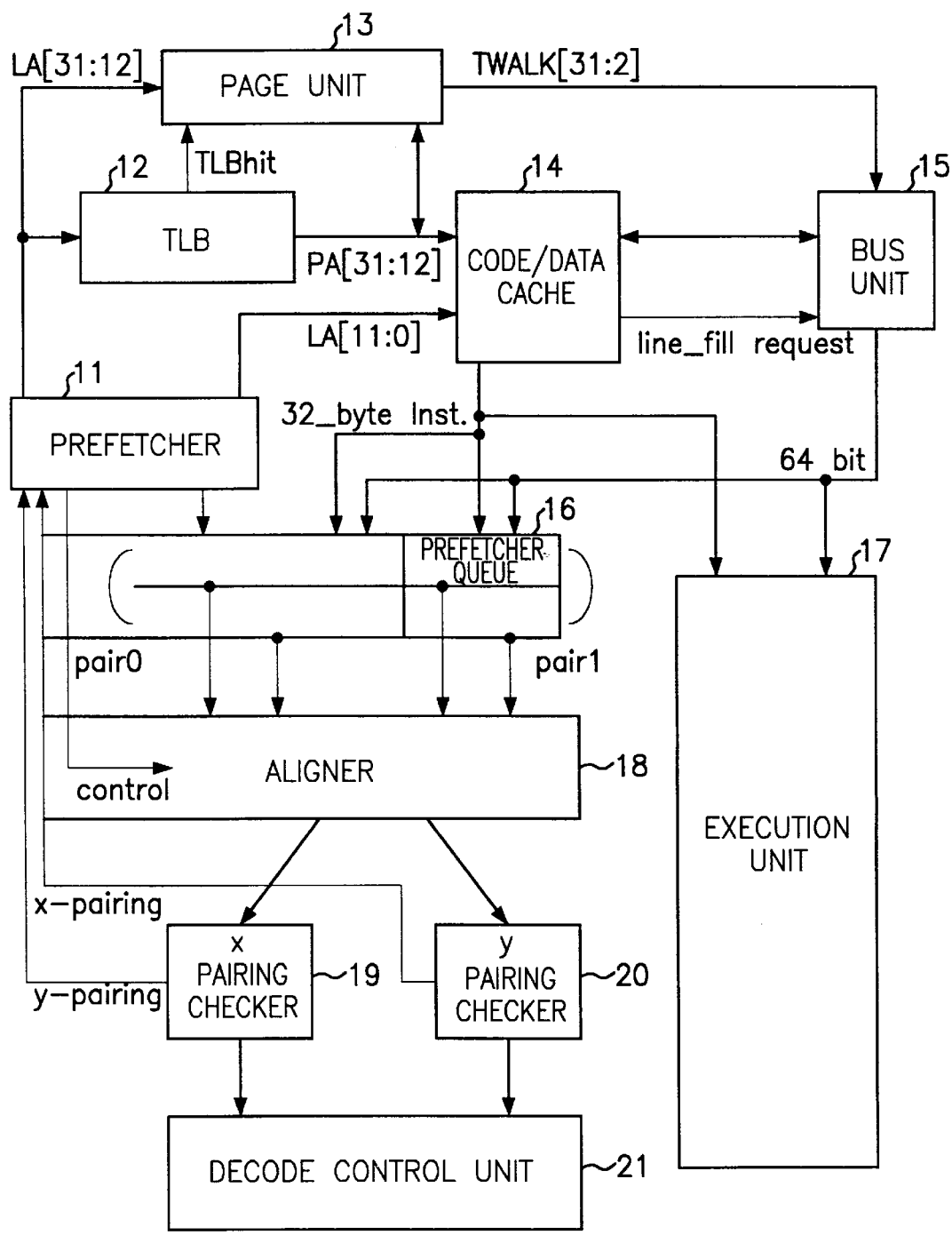
FIG. 1 illustrates a block diagram of a conventional computing system.
Figure 2:
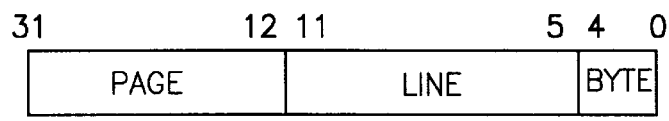
FIG. 2 depicts a diagram of an address format.

For the sake of convenience, in referring to FIG. 2, an address format is designed that a size of line is 32 bits; entry number is 128; and a linear address is 32 bits. The lower 12 bits of an address, which indicate a page size, are not translated and the upper 20 bits, which is a virtual address, are translated into a physical address.

Generally, a data is located on the border of two pages when all bits of a line address LA[11:5] are 1 and, that is, LA [11:5] are equal to 7'b1111111. Assuming that reading of data is restricted by 32-bits and a fetch of an instruction is carried out by a prefetch queue of 32-bits, various cases are described as followings.

First, there is a case that a data more than 2 bytes is needed to be read when a linear address LA [4:0] is 5'b11111.

Second, there is a case that data more than 3 bytes is needed to be read when a linear address LA [4:0] is 5'b11110.

Third, there is a case that data more than 4 bytes is needed to be read when a linear address is LA [4:0]=5'b11101.

Fourth, there is a case that an access to a split line can be reduced according to a peripheral block and a control block even though an access to the split line is carried out to fetch a 32 bit instruction when an instruction is not located on a border of the 32 bytes in case of a fetch of an instruction(a linear address LA [4:0] is not equal to 5'00000).

Figure 3:
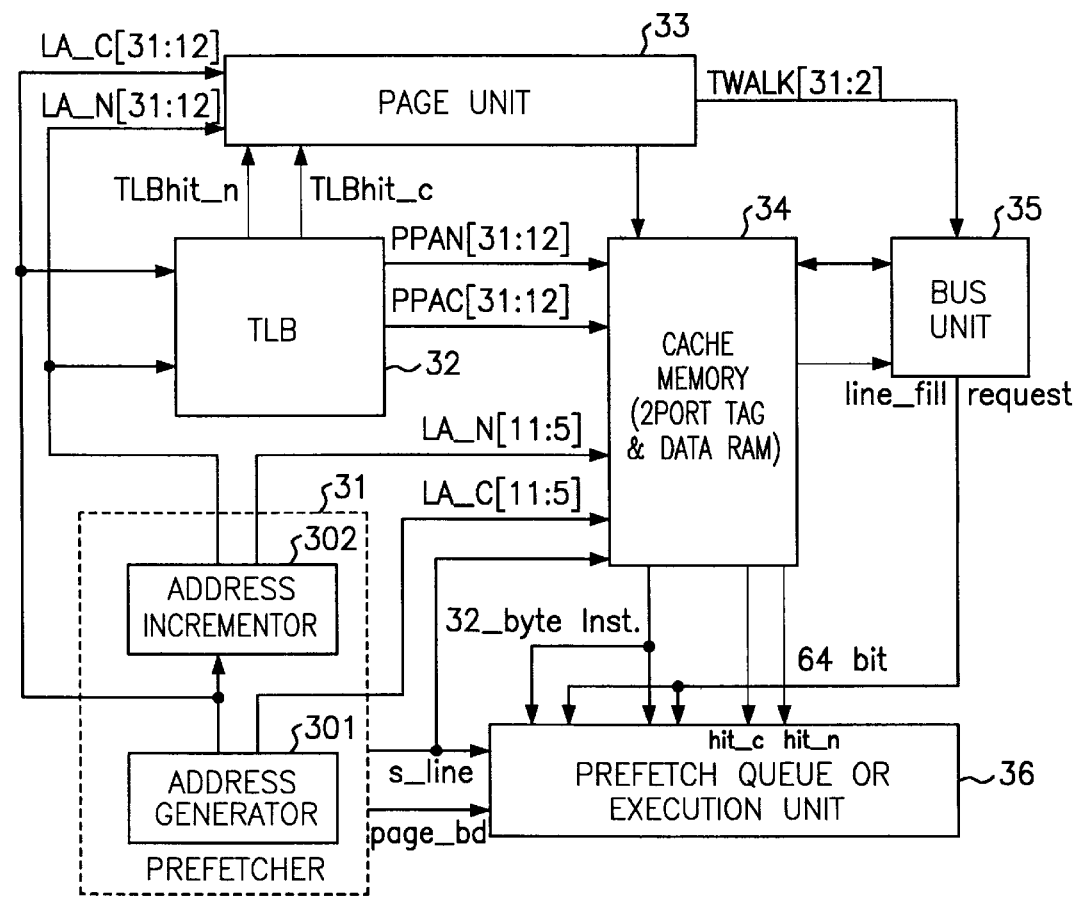
FIG. 3 describes a block diagram of a computing system in accordance with one embodiment of the present invention.

Referring to FIG. 3, there is shown a block diagram of an embodiment of a computing system in accordance with the present invention. As shown, the computing system includes a prefetcher 31, a translation lookaside buffer (TLB) 32, a page unit 33, a cache memory 34, a bus unit 35, a prefetch queue or execution unit 36, an address generator 301, and an address incrementor 302.

The prefetcher 31 outputs a page border signal (page_bd) to the prefetch queue or execution unit 36 and a spilt line signal (s_line) to the prefetch queue or execution unit 36 and the cache memory 34 for supporting a spilt line when data is located on the border of two pages by referring to the signals generated from the prefetcher 31.

The address generator 301 provides the lower 7 bits of a linear address (LA_C [11:5]) to the cache memory and the upper 20 bits of the linear address (LA_C [31:12]) to the page unit 33 and the translation lookaside buffer (TLB) 32 for an address translation by generating the linear address for an access to cache memory corresponding to a request of an access to the cache memory 34.

Also, the address generator 301 relays an address to the address incrementor 302 for generating an line address incremented by one from the current address when data is located on the border of two pages.

The address incrementor 302 increases an address value from the current line address generated from the address generator 301 by one and provides the upper 20 bits of the linear address (LA_N [31:12]) increased by 1 of an address value for an address translation to the page unit 33 and the translation lookaside buffer (TLB) 32 and also outputs the lower 7 bits of linear address (LA_N [11:5]) increased by 1 of an address value to the cache memory 34.

The translation lookaside buffer (TLB) 32, which has a dual-port structure, is provided with a current linear address (LA_C[31:12]) from the address generator 301 and an address (LA_N [31:12]) increased from the current linear address by 1 of an address value from the address incrementor 302 and then outputs the input addresses translated into a physical page address (PPAC [31:12]) of a current access line and the next line to the cache memory 34 and a hit signal of translation lookaside buffer (TLB) 32 of a current access line and the next line to page unit 33. Meanwhile, the physical address of a current line (PPAC [31:12]) has a same value of a physical address of the next line (PPAN [13:12]) unless a data needed to be accessed is not located on the border of two pages.

The cache memory 34 includes a cache tag and a cache data random access memory (RAM) wherein the cache tag has a dual-port structure, and wherein the cache data RAM has a structure designed to be able to decode two addresses in order to access a spilt line.

The cache tag generates two hit signals resulting from a comparison between a value saved in the cache tag and a physical page address (PPAC [31:12]) of the current line and also a comparison between the value saved in the cache tag and a physical page address (PPAN [31:12]) of the next line input from translation lookaside buffer (TLB) 32.

Then the cache tag outputs them to the prefetch queue or execution unit 36 of a cache request unit. Next, the cache data RAM decodes an input address and outputs saved data to the execution unit 36. Where, hit_c is a hit signal of the current line and hit_n is a hit signal of a line increased by 1 from the current line.

If an entry of the cache tag exists in each line, the current line is accessed as LA_C [11:5] and the next line is accessed as LA_N [11:5].

Therefore, hit_c is a value resulting from a comparison between a tag value of an entry accessed to a lower linear address LA_C [11:5] of a current line and an upper physical page address PPAC [31:12]) of the current line; and hit_n is a value resulting from a comparison between a tag value of an entry accessed to a lower linear address LA_N [11:5] of the increased line by 1 address value from the current line and an upper physical page address PPAC [31:12]) of the increased line by 1 address value from the current line.

TABLE 1

| Page_bd | s_line | kmiss_high | kmiss_low |
|---------|--------|------------|-----------|
| 0       | 1      | hit_c      | hit_n     |
| 1       | 0      | hit_c      | hit_n     |
| 1       | 0      | x          | x         |
| 1       | 1      | hit_c      | hit_n     |

As shown in TABLE 1, it is readily appreciated that the prefetch queue or execution unit 36, which is also called a cache request unit, can determine, whether a cache hit or miss occurs by using s_line and page_bd input from the prefetcher 36 and two hit signals (hit_c, hit_n) input from the cache tag to the prefetch queue or execution unit 36.

In referring to TABLE 1, page_bd is generated when a data is located on the border of two pages and s_line is generated when a spilt line access is needed to be supported as described above. In order to make easily an interface block related to the cache memory, a hit signal of an upper and lower half line of a line is generated. Meanwhile, kmiss_high is a hit signal corresponding to data of the upper half line generated from a cache tag and kmiss_low is a hit signal corresponding to data of a higher half line generated from a cache tag.

Figure 4:
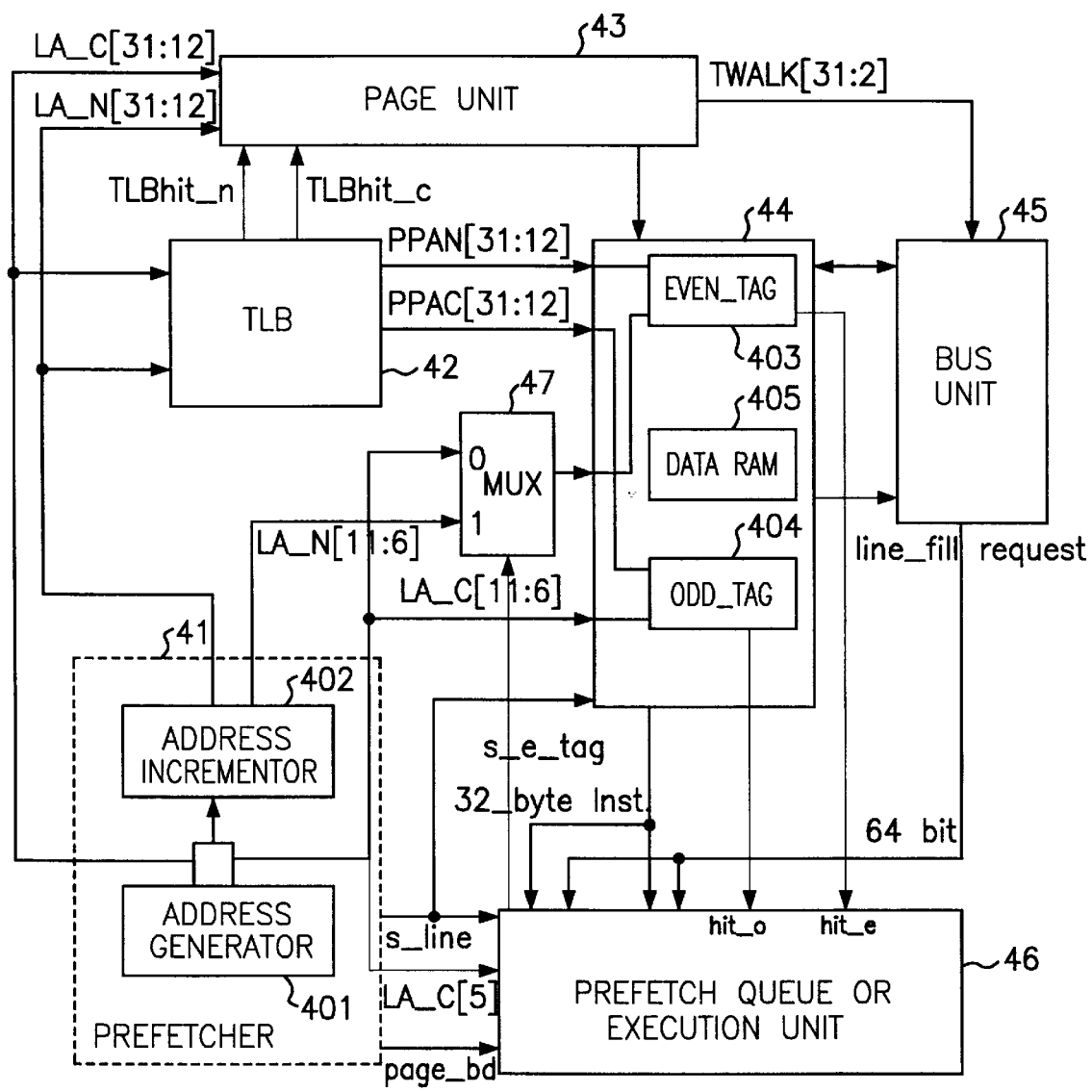
FIG. 4 provides a block diagram of a computing system in accordance with another embodiment of the present invention.

But, if it is difficult to make the cache tag which has one dual-port structure as described above because of the timing problem or the other reasons, another computing system is shown in FIG. 4.

Referring to FIG. 4, there is illustrated a block diagram of a computing system in accordance with another embodiment of the present invention. As shown, the computing system contains a prefetcher 41, a translation lookaside buffer (TLB) 42, a page unit 43, a cache memory 44, bus unit 45, a prefetch queue or execution unit 46, a multiplexer (MUX) 47, an address generator 401, and an address incrementor 402.

In accordance with another embodiment of this invention, the cache is designed to have two tag arrays which have a single-port structure. The cache data RAM is not divided. The two tag arrays divide the tag into an even tag (even_tag) 403 and an odd tag (odd_tag) 404 corresponding to a linear address bit 5 generated from prefetcher 41. A number of a physical page and related information of the line is stored in the even tag (even_tag) 403 and the odd tag (odd_tag) 404, respectively, if a linear address LA[5] is "0" and "1".

In a similar manner as shown the embodiment of this invention shown in FIG. 3, the prefetcher 41 generates a current line address for an access to the cache memory and an increased address by 1 address value from a current address and also generates a signal s_line to support an access to the page border signal (page_bd) and the spilt line.

The translation lookaside buffer (TLB), like in the previous embodiment of this invention, has a dual-port structure. The physical page address (PPAN [31:12]) of the current line address and the next line are a same value unless data is located on the border of two pages.

A linear address LA_C[5] bit generated from address generator 401, unlike in the previous embodiment of this invention, is not used in an access to the cache memory and is used as a signal to select the even tag (even_tag) or the odd tag (odd_tag).

A lower linear address, which is used as an index of the even tag(even_tag) 403 to support an access to the spilt line when a bit of LA_C[5] is 1, should use an increased address by 1 address value.

Therefore, the prefetch queue or execution unit 46, which is a cache request unit, has an LA_C [5] bit of 1 input from the prefetcher 41; and provides a selection signal (s_e_tag) of 1 to the MUX 47 in case of an access to a spilt line which is located on the border of two pages.

The multiplexer (MUX) 47 receives a lower linear address LA_C [11:6] of a current line from the address generator 401 and also a lower linear address LA_N [11:6] increased by 1 address value from the current address from address incrementor 402 and then outputs one of a selected address from the two addresses to the even tag 403 corresponding to selection signal (s_e_tag) of the cache request unit 46. Where, the linear address LA_N [11:6] increased by 1 address value is selected if selection signal (s_e_tag) is inputted as 1.

The even tag 403 receives a physical address increased by 1 address value from the translation lookaside buffer (TLB) 42; and receives one of the address of the current line (LA_C [11:6]) and the next line (LA_N [11:6]) from the MUX 47 to generate a hit signal hit_e which is coupled to the cache request unit 46.

The odd tag 404 receives a higher physical page address (PPAC[31:12]) of the current line from translation lookaside buffer(TLB) 42 and a lower linear address (LA_C[11:6]) of the current line from the address generator 401 to generate a hit signal hit_o which is relayed to the cache request unit 46.

The data RAM 405 provides stored data, like in the previous embodiment of this invention, to the cache request unit 46 by decoding the input address.

As shown in TABLE 2, the cache request unit 46 determines whether a cache hit or miss.

| Page_bd | LA_C[5] | s_line | kmiss_high | kmiss_low |
|---------|---------|--------|------------|-----------|
| 1 | x | x | hit_o | hit_e |
| 0 | 0 | 0 | hit_e | hit_e |
| 0 | 0 | 1 | hit_e | hit_o |
| 0 | 1 | 0 | hit_o | hit_o |
| 0 | 1 | 1 | hit_o | hit_e |

While the present invention has been shown and described with reference to the particular embodiments, it will be apparent to those skilled in the art that many changes and modifications may be made without departing from the spirit and scope of the invention as defined in the appended claims.

What is claimed is:

1. A computing system, which can access a code/data cache memory within one cycle when data is located on a border of two pages, comprising:
   a prefetcher for generating a virtual linear current line address corresponding to a request for access to the code/data cache memory from a prefetch queue or an execution unit, and for generating an address increased from the current line address for access to the cache memory, wherein the prefetcher includes means for generating a first signal for access to a split line and a second signal when data is located on the border of two pages;
   a page unit for controlling address translation;
   a translation lookaside buffer (TLB) for storing information needed for the address translation and translating the current line address input from the prefetcher into a physical address, wherein the translation lookaside buffer (TLB) has a dual-port structure to translate two input line addresses into physical addresses corresponding to the current line address and the address increased from the current line address;
   wherein the code/data cache memory stores an instruction to be sent to the prefetch queue or execution unit and loads instructions on a line by line basis to the prefetch queue or execution unit by receiving the physical address from the prefetcher and the translation lookaside buffer (TLB) when the code/data cache memory is requested to be accessed, wherein the code/data cache memory includes a dual-port cache tag and a cache data random access memory (RAM);
   a cache request unit for requesting access to said code/data cache memory and for outputting an instruction or data; and
   said dual-port cache tag providing a signal resulting from a comparison between values of a physical address stored in the cache tag and the physical address of the current line address input from the translation lookaside buffer (TLB) and a signal resulting from a comparison between values of a physical address of the address increased from a current line address input from the translation lookaside buffer (TLB) and a physical address of the address increased from a current line address input from the prefetcher, wherein the cache data RAM is designed to output a stored instruction.

2. The computing system of claim 1 wherein said prefetcher includes:
   means for generating the linear current line address; and
   means for providing upper address bits of the current line address needed for the address translation to the translation lookaside buffer (TLB), upper address bits in the address increased from a current line address to the translation lookaside buffer (TLB), lower bits of the current line address not needed for address translation to the code/data cache memory, and lower address bits in the address increased from a current line address not needed for address translation to the code/data cache memory.

3. A computing system, which can access a cache memory within one cycle when data is located on a border of two pages, comprising:
   a prefetcher for generating a current line address corresponding to a request for access to the cache memory from a prefetch queue or an execution unit and for generating an address increased from the current line address for access to the cache memory, wherein the prefetcher includes means for generating a first signal for access to a split line and a second signal when data is on the border of the two pages;
   a page unit for controlling address translation;
   a translation lookaside buffer (TLB) for storing information needed for the address translation and translating the current line address input from the prefetcher into a physical address, wherein the translation lookaside buffer (TLB) has a dual-port structure to translate two input addresses into physical addresses corresponding to the current line address and the address increased from the current line address;
   said cache memory storing an instruction to be sent to the prefetch queue or execution unit and loading instructions on a line by line basis to the prefetch queue or execution unit by receiving a physical address from the prefetcher and the translation lookaside buffer (TLB) when the code/data cache memory is requested to be accessed, wherein the code/data cache memory includes a single-port even tag, a single-port odd tag and a data random access memory (RAM);
   a cache request unit for requesting access to said cache memory and for carrying out an instruction output from the cache memory, wherein the cache request unit includes means for generating a selection signal to select between an address portion of the current line address which does not need to be translated and an address portion of the address increased from the current line address which does not need to be translated; and
   selection means for selecting between the address portion of the current line address which does not need to be translated and the address portion of the address increased from the current line address which does not need to be translated in response to the selection signal input from the cache request unit, wherein the even tag outputs a signal resulting from a comparison between values of a physical address of the address increased from the current line address input from the translation lookaside buffer (TLB) and a physical address stored in

9 the even tag selected corresponding to the address portion which is selected from the selection means and a signal resulting from a comparison between values of a physical address of the current line address input from the translation lookaside buffer (TLB) and a physical address saved in a tag selected by the address portion of the current line address which is input from the prefetcher, wherein the random access memory (RAM) is designed to output an instruction.

4. The computing system of claim 3, wherein said prefetcher includes:

means for generating the current line address; and means for adding one to said linear address generated from said means for generating to create the address increased from the current line address and outputting the address increased from the current line address; and outputting upper address bits of the current line address needed for the address translation to said translation lookaside buffer (TLB), upper address bits of the address increased from the current line address to said translation lookaside buffer (TLB), lower address bits of the current line address not needed for an address translation to said selection means and to said odd tag, and lower address bits in the address increased from the current line address to said selection means.

5. The computing system of claim 4, wherein said prefetcher is designed to select one of the address portion of the current line address or the address portion of the address increased from the current line address to be input to said even tag.

6. The computer system of claim 5, wherein said selection means of said cache request unit outputs a signal to select the address portion of the address increased from the current line address when a particular lower bit of the linear address output by said address generator is one.

7. A method for accessing a code/data cache memory within one cycle when data is located on a border of two pages, the method comprising:

generating, at a prefetcher, a virtual linear current line address corresponding to a request for access to the code/data cache memory from a prefetch queue or an execution unit, and generating, at the prefetcher, an address increased from the current line address for access to the cache memory, and further generating, at the prefetcher, a first signal for access to a split line and a second signal when data is located on the border of two pages;

controlling, at a page unit, an address translation;

storing, at a translation lookaside buffer (TLB), information needed for the address translation and translating the current line address input from the prefetcher into a physical address, wherein the translation lookaside buffer (TLB) has a dual-port structure to translate two input line addresses into physical addresses corresponding to the current line address and the address increased from the current line address;

storing, at the code/data cache memory, an instruction to be sent to the prefetch queue or execution unit and loading instructions on a line by line basis to the prefetch queue or execution unit by receiving the physical address from the prefetcher and the translation lookaside buffer (TLB) when the code/data cache memory is requested to be accessed, wherein the code/data cache memory includes a dual-port cache tag and a cache data random access memory (RAM);

requesting, at a cache request unit, access to said code/data cache memory and outputting an instruction or data; and

10 providing at said dual-port cache tag, a first signal resulting from a comparison between values of a physical address stored in the cache tag and the physical address of the current line address input from the translation lookaside buffer (TLB) and a second signal resulting from a comparison between values of a physical address of the address increased from a current line address input from the translation lookaside buffer (TLB) and a physical address of the address increased from a current line address input from the prefetcher, wherein the cache data RAM is designed to output a stored instruction.

8. The method of claim 7 further comprising:

generating, at the prefetcher, the linear current line address; and providing, at the prefetcher, upper address bits of the current line address needed for the address translation to the translation lookaside buffer (TLB), upper address bits in the address increased from a current line address to the translation lookaside buffer (TLB), lower bits of the current line address not needed for address translation to the code/data cache memory, and lower address bits in the address increased from a current line address not needed for address translation to the code/data cache memory.

9. A method for accessing a cache memory within one cycle when data is located on a border of two pages, comprising:

generating, at a prefetcher, a current line address corresponding to a request for access to the cache memory from a prefetch queue or an execution unit and generating an address increased from the current line address for access to the cache memory, and further generating, at the prefetcher, a first signal for access to a split line and a second signal when data is on the border of the two pages;

controlling, at a page unit, address translation;

storing, at a translation lookaside buffer (TLB), information needed for the address translation and translating the current line address input from the prefetcher into a physical address, wherein the translation lookaside buffer (TLB) has a dual-port structure to translate two input addresses into physical addresses corresponding to the current line address and the address increased from the current line address;

storing, at said cache memory, an instruction to be sent to the prefetch queue or execution unit and loading instructions on a line by line basis to the prefetch queue or execution unit by receiving a physical address from the prefetcher and the translation lookaside buffer (TLB) when the code/data cache memory is requested to be accessed, wherein the code/data cache memory includes a single-port even tag, a single-port odd tag and a data random access memory (RAM);

requesting, at a cache request unit, access to said cache memory and carrying out an instruction output from the cache memory, and generating, at the cache request unit, a selection signal to select between an address portion of the current line address which does not need to be translated and an address portion of the address increased from the current line address which does not need to be translated; and selecting between the address portion of the current line address which does not need to be translated and the address portion of the address increased from the current line address which does not need to be translated in response to the selection signal input from the cache request unit, wherein the even tag outputs a signal resulting from a comparison between values of a physical address of the address increased from the current line address input from the translation lookaside buffet (TLB) and a physical address stored in the even tag selected corresponding to the address portion which is selected from the selecting and a signal resulting from a comparison between values of a physical address of the current line address input from the translation lookaside buffer (TLB) and a physical address saved in a tag selected by the address portion of the current line address which is input from the prefetcher, wherein the random access memory (RAM) is designed to output an instruction.

10. The method of claim 9, further comprising:

generating, at the prefetcher, the current line address; and adding, at the prefetcher, one to said generated current line address generated from said generating to create the address increased from the current line address and outputting the address increased from the current line address; and outputting upper address bits of the current line address needed for the address translation to said translation lookaside buffer (TLB), upper address bits of the address increased from the current line address to aid translation lookaside buffer (TLB), lower address bits of the current line address not needed for an address translation during said step of selecting and to said odd tag, and lower address bits in the address increased from the current line address during said step of selecting.

11. The method of claim 10, further comprising selecting, at the prefetcher, one of the address portion of the current line address or the address portion of the address increased from the current line address to be input to said even tag.

12. The method of claim 11, wherein, during said step of generating a selection signal by said cache request unit, a signal to select the address portion of the address increased from the current line address is generated when a particular lower bit of the linear address output by said address generator is one.

* * * * *